Dec. 29, 1931. J. KAHL 1,838,227
TRUCK FOR AMUSEMENT CARS
Filed Dec. 3, 1929 2 Sheets-Sheet 2
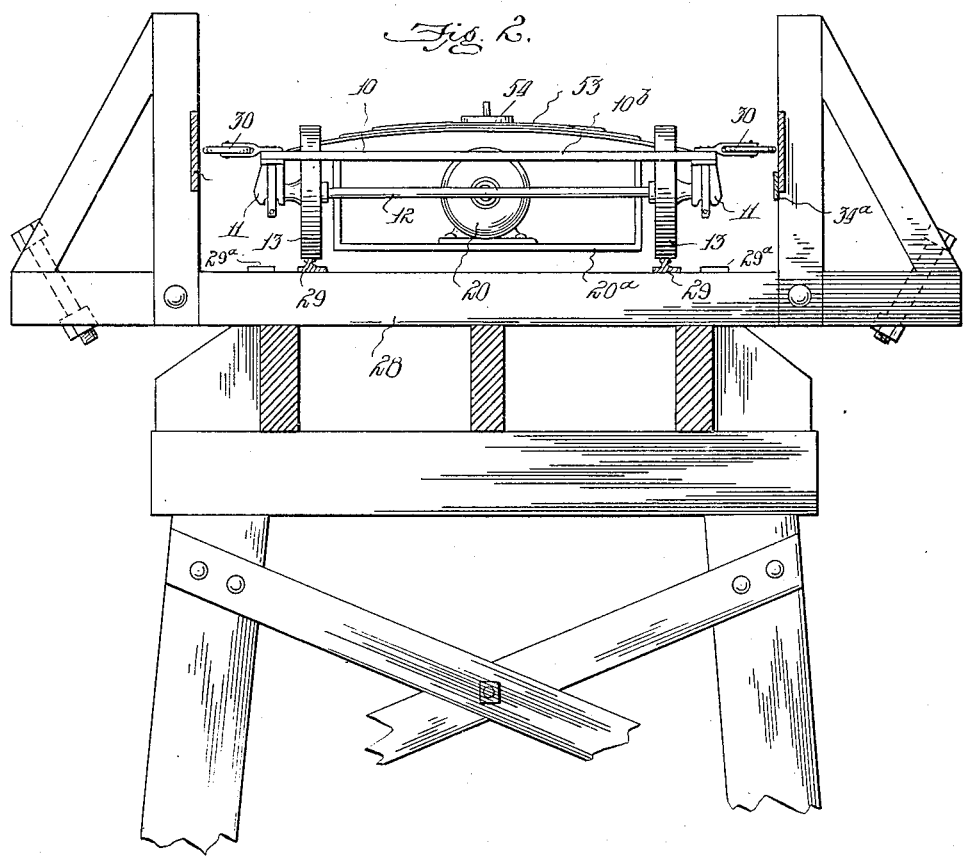
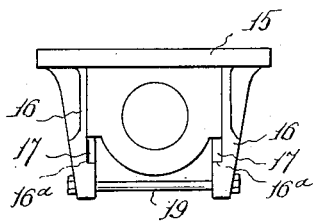
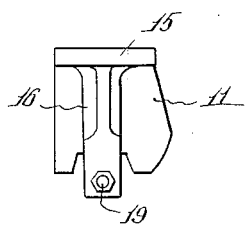
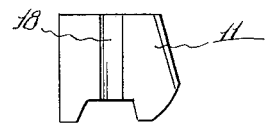
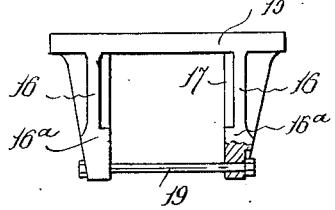
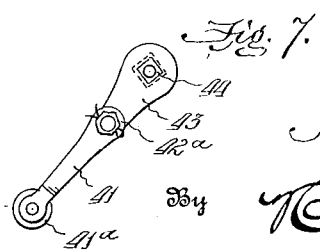
Inventor:
John Kahl
By Ternee S. Pace
Attorney.

Patented Dec. 29, 1931

1,838,227

UNITED STATES PATENT OFFICE

JOHN KAHL, OF KANSAS CITY, MISSOURI

TRUCK FOR AMUSEMENT CARS

Application filed December 3, 1929. Serial No. 411,345.

My invention relates to amusement apparatus and is more especially an improvement in trucks for passenger cars operating over a trackway and employing electricity as the motive power.

The principal object of my invention is to provide a car truck for amusement apparatus which can be safely operated over elevated railways having the usual dips and turns, with a particular mounting of the truck on the supporting wheels in connection with auxiliary operating means whereby a rocking motion is imparted to the frame supporting the car for increasing the effectiveness of the apparatus or sensations experienced by the passengers in riding.

A further object of my invention is to provide a truck for amusement apparatus of this general character which will be strong and durable to eliminate the possibility of accidents and including safety measure against the cars leaving the track, the construction of the truck being especially adaptable for use in connection with cars connected together for lateral or wabbling movement and which I term alligator cars.

Other objects and advantages of my invention will be apparent from the following description of the particular construction and operation of my improved truck, and what I claim as new and desire to protect by Letters Patent is more specifically set forth in the appended claims.

In the drawings:

Fig. 2 is an elevation showing the truck in connection with an elevated railway.

Figure 1:
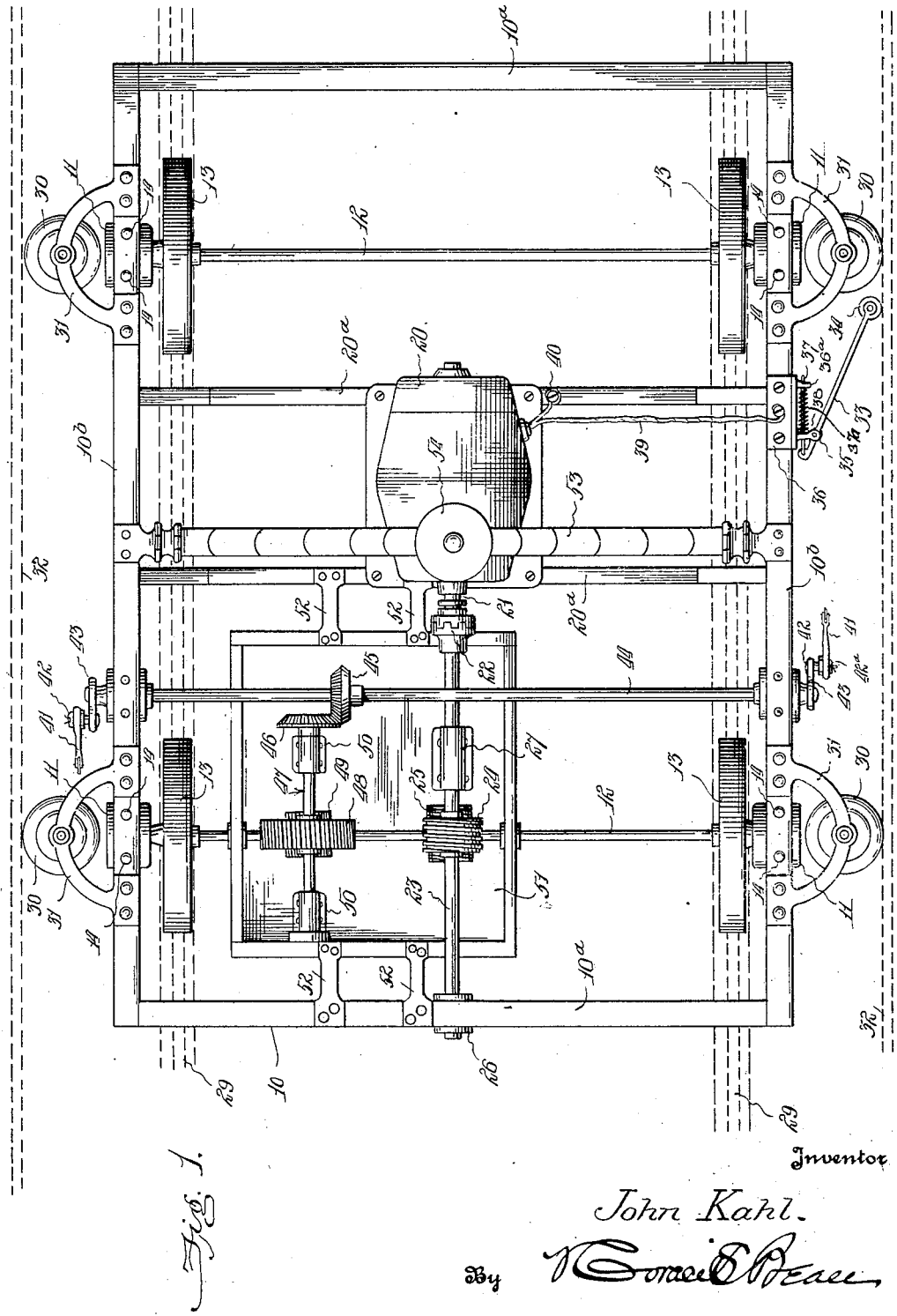
Figure 1 is a plan view of the truck.

Figs. 3, 4, 5, and 6 are detail views of the bearings for the driving axle, and

Fig. 7 is a side view of the rocker arm employed for rocking the frame of the truck from side to side.

In carrying out my invention the frame 10 of the truck is rectangular in shape with opposite side beams 10b, 10b and end cross beams 10a, 10a. the side beams carrying the bearing boxes 11 for the transverse axles 12 of the supporting wheels 13. The bearing boxes are secured to the underside of the beams by bolts 14 and are of particular construction to provide for a slight rocking movement of the truck from side to side for which purpose each bearing box is slidably mounted in a frame 15 having depending guide members 16 16 with inwardly projecting ribs 17 engaging corresponding recesses 18 in the sides of the box, the downward movement of said box being limited by shoulders 16a and the guide members braced at their lower ends by a crossbar 19. The supporting wheels are preferably provided with flat rims for slight lateral movement on the rails over which they travel, and are fixed to the axles, one of which latter is driven by an electric motor 20 suspended below the frame of the truck by crossbars 20a 20a depressed centrally to receive said motor. The shaft 21 of the motor is connected by clutch 22 to a driving shaft 23 carrying a spiral gear 24 in mesh with a corresponding gear 25 on the axle, the driving shaft being journaled at its outer end in a bearing 26 and intermediate the spiral gear and motor is supported by roller bearings in a journal box 27.

As the truck is designed to travel in an elevated trackway 28, as shown in Fig. 2, with the supporting wheels 13 resting on the rails 29 I provide safety devices for preventing the truck leaving the track, said devices consisting of horizontally disposed wheels 30 projecting from opposite sides of the frame, being mounted in arcuate frames 31 bolted on top of the side beams and adapted to engage longitudinal guide rails 32 at opposite sides of the trackway. As will be noted by reference to Fig. 2 of the drawings the supporting frames for the guide wheels are bifurcated at their outer ends to receive the wheels, and in order to overcome excessive jars or jolts said wheels are preferably provided with pneumatic tires.

The electric current is supplied to the motor by means of a trolley consisting of an arm 33 having a roller 34 at its outer end traveling over a suitable conductor 34a at one side of the trackway, the trolley arm being pivoted at its inner end to a short post 35 projecting from a bracket 36 bolted to the truck frame and spring actuated outward by rod 37 carried by post 35 and an auxiliary post 36a, a coil spring 37a being wound on the rod and interposed between post 36a and a collar 38 fixed to said rod, with the trolley arm and bracket electrically connected to the motor by means of supply wire 39 and the current grounded as usual through the supporting wheels and rails by means of a ground wire 40 connected to a metal part of the truck.

In order to impart the desired rocking motion to the truck rocker arms 41 are located at opposite sides thereof, said rocker arms being in jointed sections with the main section 43 connected to the outer section by bolt 42 having a collar 42b against which the outer section is clamped by lock nut 42a, and the main section is fixed to the squared ends of a transverse shaft 44 as shown in Fig. 7, it being noted by reference to Fig. 1 that said rocker arms extend in opposite directions from the shaft so as to operate alternately, that is to say the rocker arm at one side of the truck tilts this side of the truck upwardly when the other rocker arm is out of contact with the runway, and vice versa, and each rocker arm carries a roller 41a at its outer end to engage a flat track 29a on the elevated railway. The shaft carrying the rocker arms may be driven in any suitable manner from the electric motor, in the present instance said shaft being geared to an auxiliary shaft 47 by the intermeshing bevel-gears 45 and 46, and the said auxiliary shaft geared to the driving axle 12 by worm gears 48 and 49, with the auxiliary shaft supported in roller bearings 50 50. As will be seen by reference to Fig. 1 the gears between the driving shaft 25 and axle as well as the gears between the axle and rocker shaft are located within the oil pan 51 supported from the frame of the truck by plates 52, and of course this pan may be provided with a cover for encasing the gears to protect them.

Any form of car may be used in connection with the truck and suitably mounted thereon, but it is especially adapted to receive my particular form of alligator car or train comprising several cars connected together so that they may have a relative lateral movement to increase the sensation of riding by reason of the wabble motion imparted to the cars by the rocker arms. The preferred manner of mounting a car or body on a truck is illustrated in the accompanying drawings, in which I provide a leaf spring 53 extending across the frame of the truck and connected at its ends to the side beams, with a king pin or bolt let into a plate 54 at the center of the spring.

From the foregoing description it will be obvious that I provide a construction of truck that is especially adapted for use in connection with cars operating in an amusement park having an elevated railway with protecting side rails cooperating with safety devices on the truck, the rocker arms turning with the shaft so as to impart a rocking motion to the truck and passenger car carried thereby. As hereinbefore stated the truck is especially adapted for carrying cars in a train so that the cars will have a wabbling motion as well as a rocking motion imparted by the rocker arms.

I claim:—

1. A truck for amusement apparatus comprising a frame, axles extending across the frame and carrying the supporting wheels, vertically movable bearing boxes supported by the side beams of the frame, a shaft driven by the supporting wheels, and rocker arms keyed to said shaft to rotate therewith for imparting a rocking motion to the truck.

2. A truck for amusement apparatus comprising a wheel supported frame, vertically movable bearing boxes in which the axles carrying the wheels are journaled, a shaft driven by the supporting wheels, and rocker-arms keyed to said shaft to rotate therewith.

3. A truck for amusement apparatus comprising a wheel supported frame, vertically movable bearing boxes in which the axles carrying the wheels are journaled, a shaft driven by the supporting wheels, and sectional rocker-arms keyed to the shaft at opposite ends thereof, each rocker-arm being in two sections clamped one to another.

4. A truck for amusement apparatus comprising a wheel supported frame, vertically movable bearing boxes in which the axles carrying the wheels are journaled, a shaft driven by the supporting wheels, sectional rocker-arms keyed to the shaft at opposite ends thereof and each consisting of inner and outer sections bolted together, and a roller mounted in the outer end of the rocker-arm.

JOHN KAHL.